United States Patent
Choi et al.

(10) Patent No.: US 11,594,053 B2
(45) Date of Patent: Feb. 28, 2023

(54) DEEP-LEARNING-BASED IDENTIFICATION CARD AUTHENTICITY VERIFICATION APPARATUS AND METHOD

(71) Applicant: KAKAOBANK CORP., Gyeonggi-do (KR)

(72) Inventors: Ho Yeol Choi, Gyeonggi-do (KR); Dong Yul Lee, Gyeonggi-do (KR)

(73) Assignee: KAKAOBANK CORP., Gyeonggi-do (KR)

( * ) Notice: Subject to any disclaimer, the term of this patent is extended or adjusted under 35 U.S.C. 154(b) by 0 days.

(21) Appl. No.: 17/786,684

(22) PCT Filed: Sep. 28, 2020

(86) PCT No.: PCT/KR2020/013226
§ 371 (c)(1),
(2) Date: Jun. 17, 2022

(87) PCT Pub. No.: WO2021/162195
PCT Pub. Date: Aug. 19, 2021

(65) Prior Publication Data
US 2023/0013380 A1    Jan. 19, 2023

(30) Foreign Application Priority Data
Feb. 14, 2020 (KR) .................. 10-2020-0018242

(51) Int. Cl.
*G06V 30/14* (2022.01)
*B42D 25/23* (2014.01)
(Continued)

(52) U.S. Cl.
CPC ......... *G06V 30/1448* (2022.01); *B42D 25/23* (2014.10); *B42D 25/30* (2014.10); *G06V 10/44* (2022.01); *G06V 10/82* (2022.01)

(58) Field of Classification Search
CPC .... G06V 30/1448; G06V 10/44; G06V 10/82; B42D 25/23; B42D 25/30
See application file for complete search history.

(56) References Cited

U.S. PATENT DOCUMENTS 7,757,942 B1 * 7/2010 Ford, Sr. .......... G06Q 20/40145
235/380
10,217,179 B2 * 2/2019 Rodriguez .......... G06V 10/243
(Continued)

FOREIGN PATENT DOCUMENTS

JP  2019-536120 A  12/2019
JP  2020-008896 A   1/2020
(Continued)

OTHER PUBLICATIONS

International Search Report from corresponding PCT Application No. PCT/KR2020/013226, dated Jan. 19, 2021.
(Continued)

*Primary Examiner* — John W Lee
(74) *Attorney, Agent, or Firm* — Harness, Dickey & Pierce, P.L.C.

(57) ABSTRACT

An identification card authenticity determining method based on deep learning according to the disclosure for automatically checking authenticity of an identification card includes: inputting identification card data to a feature information extraction model to extract pieces of feature information, expressing an indicator for checking authenticity of the identification card, from the identification card data; inputting the extracted pieces of feature information to a classification model to determine authenticity of the identification card; and when it is determined that the identification card is falsified, extracting a class activation map, where a falsification region of the identification card data is activated, from the pieces of feature information.

15 Claims, 8 Drawing Sheets

(51) Int. Cl.
  *B42D 25/30* (2014.01)
  *G06V 10/44* (2022.01)
  *G06V 10/82* (2022.01)

(56) References Cited

U.S. PATENT DOCUMENTS 10,410,309 B2 *   9/2019   Rodriguez ............. G06V 30/40
2022/0400379 A1 *  12/2022  Lanov ................... H04W 80/02

FOREIGN PATENT DOCUMENTS

| KR | 10-2007-0008968 A | 1/2007 |
| KR | 10-0894696 B1 | 4/2009 |
| KR | 20-0483242 Y1 | 5/2017 |
| KR | 10-2125379 B1 | 6/2020 |

OTHER PUBLICATIONS

Notice of Allowance from corresponding Korean Patent Application No. 10-2020-0018242, dated Jun. 12, 2020.
Notice of Preliminary Examined Results from corresponding Korean Patent Application No. 10-2020-0018242, dated May 11, 2020.

* cited by examiner

DEEP-LEARNING-BASED IDENTIFICATION CARD AUTHENTICITY VERIFICATION APPARATUS AND METHOD

CROSS-REFERENCE TO RELATED APPLICATIONS

This application is a national phase application of PCT Application No. PCT/KR2020/013226, filed on 28 Sep. 2020, which claims priority to Korean Patent Application No. 10-2020-0018242, filed on 14 Feb. 2020. The entire disclosures of the applications identified in this paragraph are incorporated herein by references.

TECHNICAL FIELD

The disclosure relates to an identification card authenticity determining apparatus.

BACKGROUND ART

Internet banking denotes a service that processes various financial transactions such as deposit and withdrawal provided by banks over Internet and uses various financial information and functions. To this end, a user may establish an account provided by a bank and may use Internet banking through a corresponding account.

Users install an application in a user terminal so as to use Internet banking and process banking operation in connection with a server managing a banking operation service by using a corresponding application.

Therefore, a user may not directly visit a bank and may process various banking operations by using an application.

However, the reliability of security is low due to a characteristic of Internet banking, and authentication on a user is performed by using an identification card image obtained by capturing an identification card of the user in Internet banking service.

However, authentication based on an illegal intention is frequently performed like performing authentication based on a falsified identification card or performing authentication by using an identification card image obtained by capturing an identification card of an unauthorized user. In order to solve such a problem, when an identification card is received from a user, a bank clerk or a system manager has directly checked authenticity of the identification card with eyes.

Therefore, because a bank clerk or a system manager checks authenticity of an identification card whenever authentication is performed, there is a problem where many personnel are needed, and moreover, because a falsification identification card is precisely falsified to be incapable of being recognized with eyes, there is a problem where authenticity of an identification card is not normally checked.

DISCLOSURE

Technical Problem

The disclosure is devised to solve the above-described problem and is for providing an identification card authenticity determining apparatus and an identification card authenticity determining method based on deep learning, which may automatically check authenticity of an identification card.

Moreover, the disclosure is devised to solve the above-described problem and is for providing an identification card authenticity determining apparatus and an identification card authenticity determining method based on deep learning, which may check authenticity of an identification card by using a neural network model generated based on deep learning.

Moreover, the disclosure is devised to solve the above-described problem and is for providing an identification card authenticity determining apparatus and an identification card authenticity determining method based on deep learning, which may explain an authenticity check result.

Technical Solution

An identification card authenticity determining method based on deep learning according to an aspect of the disclosure for accomplishing the above-described objects includes: inputting identification card data to a feature information extraction model to extract pieces of feature information, expressing an indicator for checking authenticity of the identification card, from the identification card data; inputting the extracted pieces of feature information to a classification model to determine authenticity of the identification card; and, when it is determined that the identification card is falsified, extracting a class activation map, where a falsification region of the identification card data is activated, from the pieces of feature information.

Moreover, an identification card authenticity determining apparatus based on deep learning according to an aspect of the disclosure includes: a memory storing a plurality of program modules; and a processor executing the plurality of program modules stored in the memory, wherein each of the plurality of program modules includes: a feature information extractor inputting identification card data, obtained by capturing an identification card, to a feature information extraction model to extract pieces of feature information, expressing an indicator for checking authenticity of the identification card, from the identification card data; a determiner inputting the extracted pieces of feature information to a classification model to determine authenticity of the identification card; and a falsification region extractor extracting a class activation map, where a falsification region of the identification card data is activated, from the pieces of feature information when it is determined that the identification card is falsified.

Advantageous Effect

According to the disclosure, because authenticity of an identification card may be automatically checked, authenticity of the identification card may be quickly checked, and moreover, personnel may not be needed, whereby there may be an effect of decreasing the cost.

Moreover, because authenticity of an identification card may be checked by using a neural network model generated based on deep learning, the disclosure may determine a falsified identification card incapable of being recognized with eyes, and moreover, there may be an effect of enhancing the reliability of Internet banking.

Moreover, the disclosure may explain an authenticity check result, and thus, has an effect of effectively responding to an objection of a user which has issued a request to check authenticity of an identification card.

MODE FOR INVENTION

Figure 1:
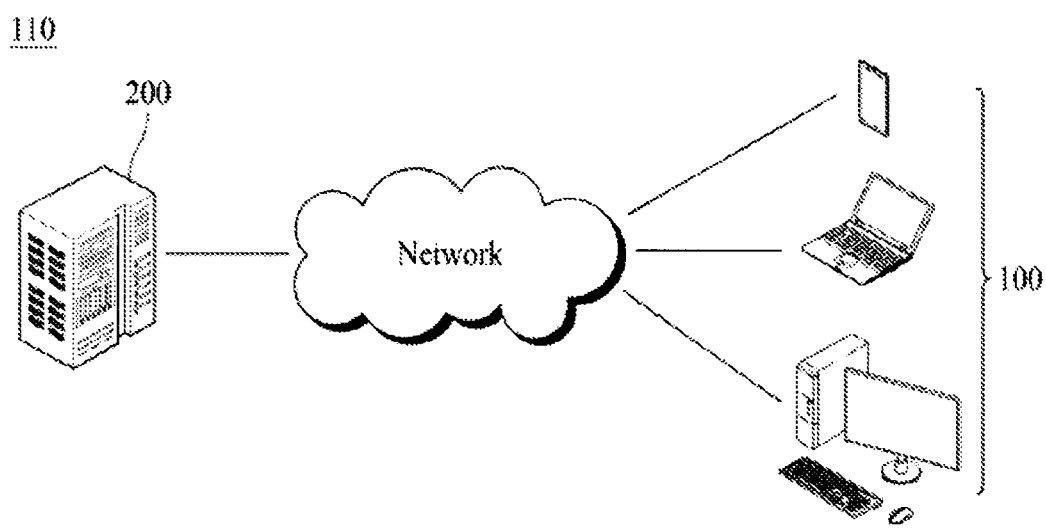
FIG. 1 illustrates an identification card authenticity determining system for determining authenticity of an identification card according to an embodiment of the disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only' is used. The terms of a singular form may include plural forms unless referred to the contrary.

In construing an element, the element is construed as including an error range although there is no explicit description.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of this specification will be described in detail with reference to the accompanying drawings.

FIG. 1 illustrates an identification card authenticity determining system for determining authenticity of an identification card according to an embodiment of the disclosure. The identification card authenticity determining system 10 performs authentication on a corresponding user by using identification card data obtained from an identification card of the user. In an embodiment, the identification card authenticity determining system 10 may be a banking system which provides a banking service, and the identification card data may be an identification card image obtained by capturing the identification card of the user. In this case, authentication may be for performing a banking service including establishment of an account and loan.

The identification card authenticity determining system 10, as illustrated in FIG. 1, includes a user terminal 100 and an identification card authenticity determining apparatus 200. Hereinafter, for convenience of description, the disclosure will be described on the assumption that the identification card authenticity determining system 10 is a banking system and the identification card authenticity determining apparatus 200 is a banking server. In this case, a reference numeral of the banking system uses the same reference numeral as a reference numeral of the identification card authenticity determining system 10, and a reference numeral of the banking server uses the same reference numeral as a reference numeral of the identification card authenticity determining apparatus 200.

The user terminal 100 provides a banking service to a user in connection with the banking server 200 over a network. To this end, a banking application is installed in the user terminal 100. The banking application receives a banking service request from the user and transfers the banking service request to the banking server 200, and thus, the banking service requested by the user is processed by the banking server 200.

For example, when an account establishment request or an account transfer request is issued from a user, the banking application may transmit the account establishment request or the account transfer request to the banking server 200, and thus, an account may be established by the banking server 200 or transfer-requested money may be transferred.

The banking application according to the disclosure generates an identification card capture request for performing authentication on a user. For example, when an account establishment request is issued from the user, the banking application 10 may generate an identification card capture request for performing authentication of a corresponding user. As another example, when a loan request is issued by a user, the banking application may generate an identification card capture request for performing authentication of a corresponding user. As another example, when an account transfer request is issued by a user, the banking application 10 may generate an identification card capture request for performing authentication of a corresponding user.

According to such an example, a corresponding user may capture an identification card by using the user terminal 100 to generate identification card data.

When the identification card data is generated, the banking application transmits the generated identification card data to the banking server 200 to allow authenticity of the identification card to be checked. The banking application receives an authenticity check result of the identification card from the banking server 200 and provides the authenticity check result to the user.

In the specification, it is mainly described that the banking application receives the authenticity check result of the identification card from the banking server 200 and provides the authenticity check result to the user, but according to another embodiment of the disclosure, the banking application may perform a function performed by the banking server 200. Alternatively, some functions performed by the banking server 200 may be performed by the banking application.

Such a banking application may be downloaded through on-line market such as App Store or Google Play and may be installed in the user terminal 100 or may be installed in manufacturing a terminal in a terminal manufacturer.

The user terminal 100 may include a personal computer (PC) or a notebook computer including a wired Internet access and browsing function, a notebook computer or a portable terminal including a wireless LAN/portable Internet access and browsing function, or a personal communication system (PCS), a global system for mobile (GSM) terminal, a personal digital assistant (PDA), or a smartphone including a mobile communication network access and browsing function.

The banking server 200 provides a banking service to the user in connection with the user terminal 100. In detail, the banking server 200 provides the banking service to the user in connection with the banking application installed in the user terminal 100.

For example, when an account establishment request is received from the banking application, the banking server 200 may establish an account on the basis of the account establishment request. As another example, when a transfer request is received from the banking application, the banking server 200 may transfer transfer-requested money from an account of the user to an account which is a transfer target, on the basis of the transfer request.

The banking server 200 according to the disclosure may receive identification card data from the banking application and may check authenticity of the identification card data. Particularly, the banking server 200 according to the disclosure may perform authenticity of the identification card data on the basis of deep learning.

Moreover, when it is determined that the identification card is falsified, the banking server 200 according to the disclosure may generate a class activation map where a falsification region of the identification card data is activated. Accordingly, the banking server 200 according to the disclosure may simply determine falsification of the identification card and may also check the falsification region of the identification card, and thus, may check the reason that a system manager determines falsification of the identification card.

Figure 2:
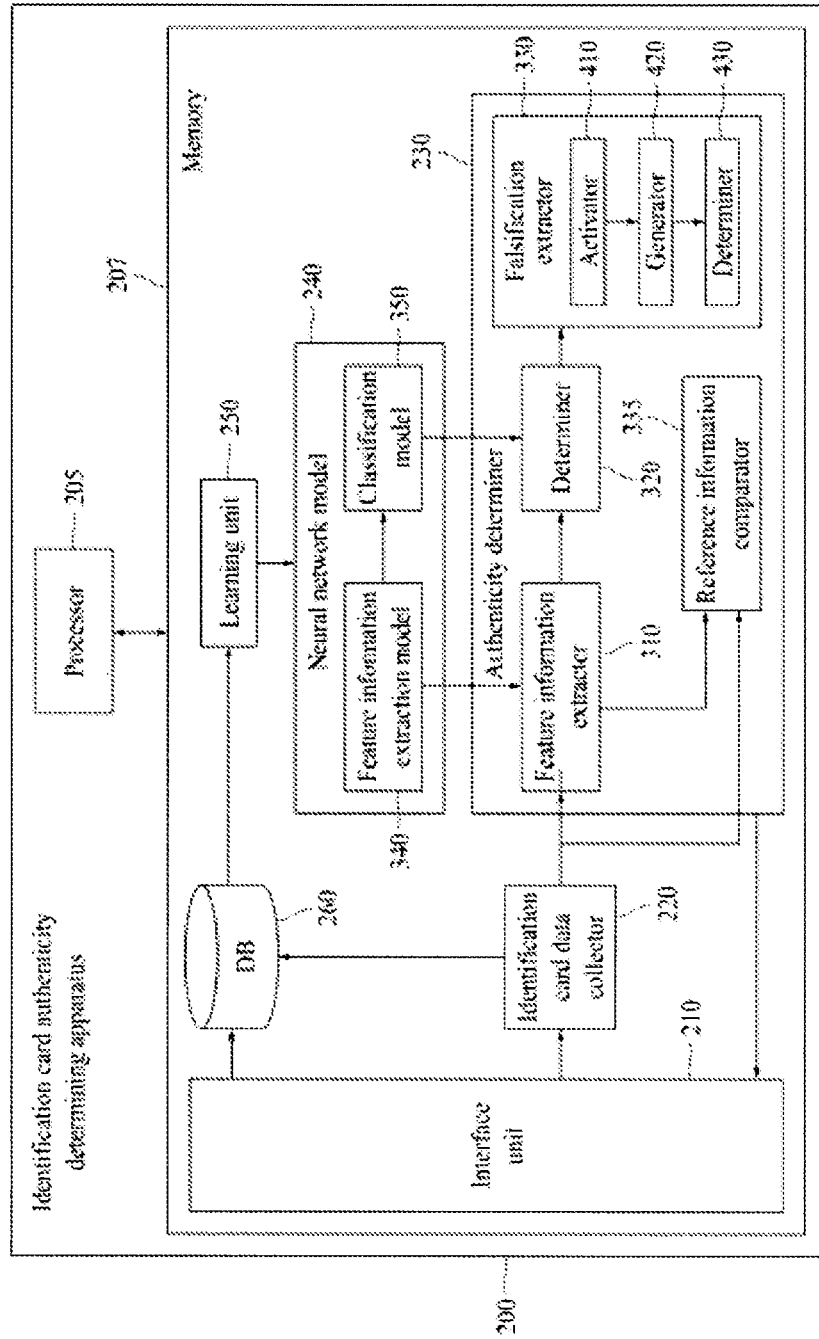
FIG. 2 illustrates a configuration of a banking server according to an embodiment of the disclosure.

FIG. 2 illustrates a configuration of a banking server according to an embodiment of the disclosure.

The banking server 200, as illustrated in FIG. 2, may include a physical element such as a processor 205 and a memory 207. Also, the banking server 200 may include one or more program modules implemented in a software form configured to be executed by the processor 205, and the one or more program modules may be stored in the memory 207. The one or more program modules may include an interface unit 210, an identification card data collector 220, an authenticity determiner 230, a neural network model 240, and a learning unit 250, and a database 260 may be additionally stored in the memory 207.

The processor 205 may execute one or more modules 210 to 250 stored in the memory 207, or may execute various kinds of instruction sets. Also, the processor 205 may process various software functions in addition to the modules 210 to 250 illustrated in FIG. 2, or may process data.

The memory 207 may include a non-volatile memory such as a high-speed random access memory, one or more magnetic disk storage devices, and a flash memory device. Also, the memory 207 may further include a storage device which is disposed apart from the processor 205 and is accessible over a communication network such as Internet.

The interface unit 210 receives a request and a response transmitted from the user terminal 100 and transmits a request and a response to the user terminal 100. In detail, the interface unit 210 receives a request and a response from the banking application installed in the user terminal 100 and transmits a request and a response to the banking application.

For example, the interface unit 210 may receive an account establishment request from the banking application, and when an account is established based on the account establishment request, the interface unit 210 may transmit an account establishment response to the banking application.

In an embodiment, the interface unit 210 may receive identification card data obtained by capturing an identification card from the banking application. In this case, the identification card data received by the interface unit 210 may be data obtained through the user terminal 100 in real time.

For example, the identification card data may be an identification card image obtained through the user terminal 100 in real time, and in this case, the interface unit 210 may receive, as the identification card data, an identification card image consisting of a plurality of frames.

The identification card data collector 220 collects the identification card data received by the interface unit 210. In this case, the identification card data may be collected in various forms like vector data as well as an image. The identification card collector 220 may store the collected identification card data in the database 260.

The identification card data collector 220 transfers the collected identification card data to the authenticity determiner 230.

The authenticity determiner 230 determines authenticity of the identification card, and when it is determined that the identification card is falsified, the authenticity determiner 230 generates a class activation map where the falsification region of the identification card data is activated.

To this end, the authenticity determiner 230 inputs the identification card data to the neural network model 240 to check authenticity of the identification card and generates the class activation map. In this case, the neural network model 240 may be implemented with a convolution neural network (CNN) algorithm. Also, the neural network model 240 may be implemented with a recurrent neural network (RNN) algorithm or a neural network (NN) algorithm. However, for convenience of description, an example where the neural network model 240 according to the disclosure is implemented with a CNN algorithm will be described below.

The authenticity determiner 230, as illustrated in FIG. 2, includes a feature information extractor 310, a determiner 320, a falsification region extractor 330, and a reference information comparator 335. Also, as illustrated in FIG. 2, the neural network model 240 used by the authenticity determiner 230 includes a feature information extraction model 340 and a classification model 350.

The feature information extractor 310 inputs the identification card data to the feature information extraction model 340 included in the neural network model 240, and thus, extracts a plurality of feature vectors or a plurality of feature maps from the identification card data. In this case, a feature vector or a feature map represents an indicator for checking authenticity of the identification card. The indicator for checking authenticity of the identification card may include hologram information in the identification card, reflected light information in the identification card, shadow information in the identification card, Moire pattern information, face information included in the identification card, and reference information included in the identification card. In this case, the Moire pattern denotes a pattern which is generated when display is captured. The reference information denotes an issued date, a social security number, an address, or a name, etc.

According to such an embodiment, the feature information extraction model 340 may be one model which has learned indicators for checking authenticity of an identification card, or may be configured with a plurality of models which has learned for each indicator.

Figure 3A:
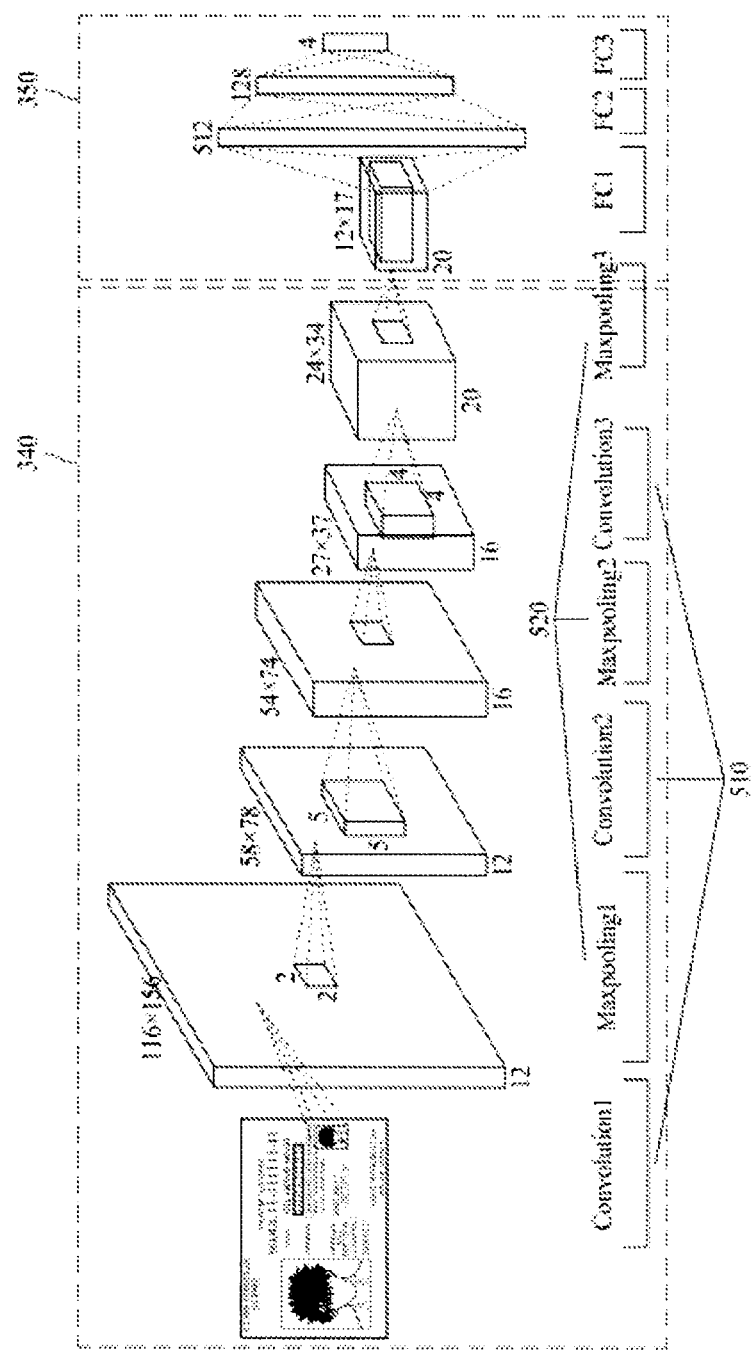
FIG. 3A and FIG. 3B illustrate a structure of a feature information extraction model and a classification model included in a neural network model according to an embodiment of the disclosure.
Figure 3B:
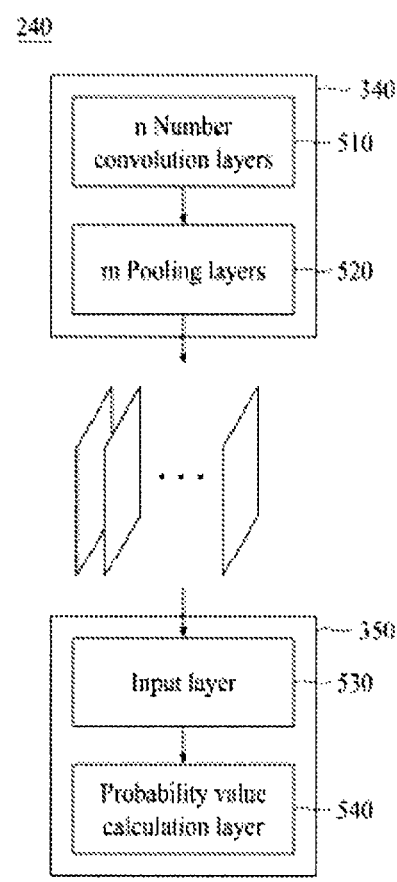

Hereinafter, the feature information extraction model 340 which extracts feature information from the identification card data input by the feature information extractor 310 will be described in more detail with reference to FIGS. 3A and 3B. FIG. 3A is a diagram for describing an embodiment which extracts a feature vector as feature information from identification card data to determine a falsification region, and FIG. 3B is a diagram for describing an embodiment which extracts a feature map having an image form as feature information from identification card data to determine a falsification region.

First, FIG. 3A illustrates a configuration of a CNN layer for extracting a feature vector from identification card data to detect a falsification region, and the CNN layer illustrated in FIG. 3A may be a layer which has learned by using predetermined learning data (for example, various kinds of identification card data).

The CNN layer may include the feature information extraction model 340 which extracts a feature vector as feature information about input identification card data and a classification model 350 which classifies a class, and the feature information extraction model 340 may be implemented in a form where n number convolution layers 510 and m number of pooling layers are stacked in layers. The convolution layer 510 is an essential factor where an activation function is reflected after a filter is applied to input data, and the pooling layer 520 may be selectively applied.

To extract feature data from the identification card data, in the feature information extraction model 340, as in FIG. 3A, a convolution is calculated when the filter moves on the identification card data and a feature vector is generated by using the calculation result. In the convolution layer 510, an output data format may be changed based on a filter size, stride, the application or not of padding, and a max-pooling size. The pooling layer 520 may receive output data from the convolution layer 510 as an input, and the output data may be used to emphasize feature data or decrease a size.

The classification model 350 disposed next to the feature information extraction model 340 may be a fully connected (FC) layer for image classification, and a flatten layer which converts data having an image form into data having an array form may be disposed between a portion of extracting a feature of an image and a portion of classifying an image.

For example, a feature vector of the disclosure may include a hologram, reflected light, a Moire pattern, the match or not of a photograph, the match or not of social security number, and the match or not of sex, and image data. In the embodiment referring to FIG. 3A, a feature vector representing a hologram, reflected light, and a Moire pattern may be expressed in a vector value form of a fully connected layer previous to a soft max layer. Furthermore, sex based on face image analysis, a real age obtained by using an age prediction result and an optical character reader (OCR) result, and a difference value (for example, 0 when sex matches or 1 when sex mismatches) regarding to the sex may be expressed as a vector value. Also, in the case of image data, a feature vector may be generated using color image data itself as input data.

In the embodiment, a feature vector representing elements of the disclosure may be expressed in a one-dimensional or multi-dimensional matrix form. The feature vector may be expressed as a variation amount value or a binary value of predetermined elements for determining falsification.

In an embodiment, the classification model 350 configured with a soft max function and the fully connected layer illustrated in FIG. 3A may be provided for each feature vector output from the feature information extraction model 340. Furthermore, in another embodiment, the classification model 350 may merge feature vectors output from the feature information extraction model 340 and may use a merged feature vector as a new input feature vector and may be implemented so that the merged feature vector is input to one classification model 350.

The disclosure may determine the falsification or not of identification card data on the basis of a final vector value output through an output layer. For example, comparing with a real identification card, in a falsified identification card using a copy, a variation amount of a hologram may differ or there may be no reflected light. When a vector value representing a hologram variation amount or the presence of reflected light is outside a range of a value of a real identification card, corresponding identification card data may be determined to be falsified.

As another example, in a falsified identification card obtained by capturing a monitor, a Moire pattern in identification card data may be detected, and the falsification or not of corresponding identification card data may be determined based on a vector value representing the pattern.

Moreover, in a text (a name, a social security number, etc.) included in an identification card, the match or not of identification card data may be checked by searching for information recognized as an OCR result in organization API, and thus, the falsification or not of corresponding identification card data may be determined and the falsification or not of corresponding identification card data may be expressed by expressing a match check result as a vector value (for example, 0 or 1).

Furthermore, the feature information extraction model 340 of the disclosure may more precisely determine the falsification or not of identification card data by using a secondary indicator. For example, the feature information extraction model 340 may compare an age, recognized through a social security number of an identification card, with an age estimated from a photograph of an identification card to determine the falsification or not of identification card data based on the comparison result. Also, a past history of an identification card photograph or a history of the other organization may be used as a secondary indicator which determines the falsification or not of an identification card.

The neural network model 240 of the disclosure may generate a class activation map CAM by using output results of the feature information extraction model 340 and the classification model 350 and may determine the falsification or not of an identification card on the basis of a vector value configuring the class activation map. When feature information has a feature vector form, several vector values configuring the class activation map may be calculated, and a vector value outside a reference value among the calculated vector values may be determined to be falsification.

According to an embodiment, the neural network model 240 may calculate only a falsification determination result, and when a detailed check of a falsified factor is required, a vector value determined to be falsification may be checked and a falsification region may be detected by reversely tracing the vector value.

FIG. 3B is a diagram illustrating a structure of a feature information extraction model 340 and a classification model 350 included in a neural network model 240 according to an embodiment of the disclosure.

The feature information extraction model 340, as illustrated in FIG. 3B, extracts a plurality of feature maps as feature information from identification card data input thereto.

The feature information extraction model 340, as illustrated in FIG. 3B, includes n number of convolution layers 510 and m number of pooling layers 520.

The n convolution layers 510 which are sequentially arranged apply a convolution filter having a predetermined size to identification card data to generate a plurality of feature maps. Here, n may be an integer of 2 or more.

In this case, convolution filters used in each convolution layer 510 may be different filters and may be filters which extract different features.

The n convolution layers 510 apply an activation function to the generated plurality of feature maps to assign a nonlinear characteristic to the plurality of feature maps. Here, the activation function denotes a function which assigns a weight to pieces of input information to output a completed result value through combination. In an embodiment, the activation function may be a Relu function which outputs a positive value as-is among pixel values of a feature map and outputs a negative value as 0. In another embodiment, the activation function may be a PRelu function which outputs a positive value as-is among pixel values of a feature map and outputs a negative value as a value reduced by a predetermined size. In the above-described embodiment, the activation function has described as the Relu function or the PRelu function, but this is merely an embodiment and the disclosure is not limited thereto.

The m pooling layers 520 are disposed in at least one output terminal among the n convolution layers 510 and apply a sampling filter having a predetermined size to a plurality of feature maps to decrease a dimension. In an embodiment, the m pooling layers 520 may be a max-pooling layer which extracts a maximum value as a feature value of a feature map among pixel values included in a region corresponding to a sampling filter in each feature map. However, the pooling layer 520 according to the disclosure may be merely max-pooling and may be performed by various methods such as average pooling and long-sum-exponential (LSE), and this may be merely an implementation method difference.

Referring again to FIG. 2, the feature information extractor 310 transfers feature information, extracted through the feature information extraction model 340, to the determiner 320. As described above, feature information extracted through the feature information extraction model 340 may be a feature map having an image form or a feature vector. Hereinafter, for convenience of description, the disclosure will be described on the assumption that feature information extracted through the feature information extraction model 340 is a feature map, but a feature of the disclosure described below may be identically applied to a case where feature information is a feature vector.

The determiner 320 inputs a plurality of feature maps to the classification model 350 to determine the falsification or not of an identification card.

The classification model 350 used by the determiner 320 for determining the falsification or not of an identification card will be described below in more detail with reference to FIG. 3B.

The classification model 350 calculates a probability value representing the falsification or not of an identification card by using a plurality of feature maps input thereto. In this case, the classification model 350 may be implemented with a plurality of models which each calculate a probability value of an indicator so as to check the falsification or not of the identification card, and unlike this, may be implemented with one model which calculates one probability value representing the falsification or not of the identification card by reflecting all indicators for checking the falsification or not of the identification card.

Furthermore, as illustrated in FIG. 3B, the classification model 350 includes an input layer 530 and a probability value calculation layer 540.

In an embodiment, the input layer 530 may be a global average pooling layer which applies a sampling filter having a predetermined size in each feature map to average pixel values included in a region corresponding to the sampling filter, and thus, decreases dimensions of a plurality of feature maps.

However, the input layer 530 according to the disclosure may be merely a global average pooling layer and may be implemented based on various methods such as a fully connected layer.

The probability value calculation layer 540 may be a soft max layer which assigns a weight to a plurality of dimension-reduced feature maps to calculate a probability value representing the authenticity or not of an identification card.

However, the probability value calculation layer 540 may be a soft max layer, and moreover, may be configured based on various methods.

Furthermore, the classification model 350 may predict an age and sex of a corresponding user by using a feature map expressing face data of an identification card photograph. According to such an embodiment, the probability value calculation layer 540 of the classification model 350 may calculate a probability value representing the falsification or not of an identification card, and moreover, may additionally calculate a probability value representing an age and sex. According to such an embodiment, the determiner 320 may transfer an age and sex, predicted from the classification model 350, to the reference information comparator 335.

Referring again to FIG. 2, when a probability value output from the classification model 350 is less than a predetermined threshold value, the determiner 320 determines that an identification card is falsified. When the probability value is greater than or equal to the predetermined threshold value, the determiner 320 determines that an identification card is normal. The determiner 320 transmits a determination result to the banking application installed in the user terminal 100.

In the above-described embodiment, it has been described that the feature map extractor 310 inputs identification card data to the feature map extraction model 340 to extract a feature map and the determiner 320 determines the falsification or not of an identification card by using the extracted feature map.

However, unlike such an embodiment, a feature vector may be extracted from identification card data by using a feature vector extractor (not shown), and the determiner 320 may also determine the falsification or not of an identification card by using the feature vector.

Hereinafter, an example where a feature vector extractor according to the disclosure extracts a feature vector from identification card data will be described in more detail.

The feature vector extractor may input identification card data to a feature vector extraction model (not shown) to extract a feature vector. In this case, the feature vector may include a first feature vector expressing a hologram, a second feature vector expressing reflected light, a third feature vector expressing a shadow, and a fourth feature vector expressing a Moire pattern, etc.

In an embodiment, the feature vector extraction model may include a first feature vector extraction model, a second feature vector extraction model, a third feature vector extraction model, and a fourth feature vector extraction model.

Here, the first feature vector extraction model is a model which extracts a first feature vector expressing a hologram from an identification card image, the second feature vector extraction model is a model which extracts a second feature vector expressing reflected light from the identification card image, the third feature vector extraction model is a model which extracts a third feature vector expressing a shadow from the identification card image, and the fourth feature vector extraction model is a model which extracts a fourth feature vector expressing a Moire pattern from the identification card image.

Unlike such an embodiment, as described above, one feature vector extraction model may extract the first to fourth feature vectors, and this is merely a difference between implementation methods and the disclosure is not limited thereto.

The feature vector extractor may extract the first to fourth feature vectors from the feature vector extraction model and may merge the first to fourth feature vectors to generate one mergence feature vector. In this case, the mergence feature vector may be a four-dimensional feature vector and may be a feature vector expressing a hologram, reflected light, a shadow, and a Moire pattern.

The feature vector extractor may transfer the mergence feature vector to the determiner 320.

The determiner 320 may input the mergence feature vector to the classification model 350 to determine authenticity of an identification card. When a probability value output from the classification model 350 is less than a predetermined threshold value, the determiner 320 determines that the identification card is falsified. When the probability value is greater than or equal to the predetermined threshold value, the determiner 320 determines that the identification card is normal. The determiner 320 transmits a determination result to the banking application installed in the user terminal 100.

Unlike such an embodiment, the feature vector extractor may transfer the first to fourth feature vectors, extracted from the identification card data, to the determiner 320. According to such an embodiment, the determiner 320 may input the first to fourth feature vectors to the classification model 350.

According to such an embodiment, the classification model 350 may calculate a first probability value representing whether there is a hologram, a second probability value representing whether there is reflected light, a third probability value representing whether there is a shadow, and a fourth probability value representing whether there is a Moire pattern.

When at least one of the first to fourth probability values is less than the predetermined threshold value, the determiner 320 may determine that an identification card is falsified, and when all of the first to fourth probability values is greater than the predetermined threshold value, the determiner 320 may determine that the identification card is normal.

Unlike such an embodiment, the classification model 350 may output an identifier representing whether there is a hologram, an identifier representing whether there is reflected light, an identifier representing whether there is a shadow, and an identifier representing whether there is a Moire pattern, and the determiner 320 may determine the falsification or not of the identification card on the basis of the identifiers.

In this case, the identifiers may be set based on authenticity of an identification card.

For example, when there is a hologram, the classification model 350 may output 1, and when there is no hologram, the classification model 350 may output 0. When there is reflected light, the classification model 350 may output 1, and when there is no reflected light, the classification model 350 may output 0. When there is a shadow, the classification model 350 may output 1, and when there is no shadow, the classification model 350 may output 0. When there is a Moire pattern, the classification model 350 may output 1, and when there is no Moire pattern, the classification model 350 may output 0. In this case, when at least one identifier is 0, the determiner 320 may determine that the identification card is falsified, and when all identifiers are 1, the determiner 320 may determine that the identification card is normal.

In such as embodiment, it has been described that the number of classification models 350 is one, but this is merely an embodiment and the classification model 350 may be provided for each feature vector.

When it is determined by the determiner 320 that an identification card is falsified, the falsification region extractor 330 may extract a class activation map, where a falsification region of identification card data is activated, from a plurality of feature maps extracted by the feature information extractor 310.

The reason that the falsification region extractor according to the disclosure extracts the class activation map from the plurality of feature maps is following. The classification model 350 may classify the falsification or not of an identification card from a plurality of feature maps when the plurality of feature maps are input to the classification model 350. However, there is a problem where the system manager may not explain an authenticity result because the system manager may not know how the classification model 350 derives a determination result because the classification model 350 based on deep learning model is a black box.

Therefore, the disclosure may extract the class activation map, and thus, because it is possible to explain an authenticity result, the disclosure may effectively respond to an objection of a user, whereby there is an effect where system reliability is enhanced.

To this end, the falsification region extractor 330 may include an activator 410 and a generator 420.

The activator 410 according to the disclosure assigns a weight of the classification model 350 to each of a plurality of feature maps to activate a falsification region in each feature map. In this case, the weight of the classification model 350 may denote a weight which is assigned for classifying the plurality of feature maps in the probability value calculation layer 540.

The generator 420 combines feature maps activated by the activator 410 to generate a class activation map. In detail, the generator 420 summates the activated feature maps to generate a class activation map.

Figure 4:
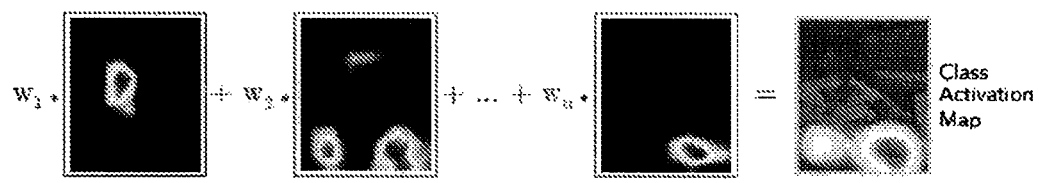
FIG. 4 illustrates an example which summates activated feature information to generate a class activation map by using a generator according to an embodiment of the disclosure.

FIG. 4 illustrates an example which summates activated feature information to generate a class activation map by using a generator according to the embodiment of the disclosure.

As illustrated in FIG. 4, the activator 410 assigns a weight to each of a plurality of feature maps to activate the feature maps. The generator 420 summates the activated feature maps to generate a class activation map.

The generator 420 stores the generated class activation map in the database 260.

In an embodiment, the generator 420 may transfer the class activation map to the user terminal 100 through the interface unit 210. In detail, the generator 420 may transmit the class activation map to the banking application installed in the user terminal 100 through the interface unit 210.

The falsification region extractor 330 according to the disclosure, as illustrated in FIG. 2, may further include a determiner 430 which determines an indicator representing the falsification of an identification card.

The determiner 430 according to the disclosure determines the indicator representing the falsification of the identification card from the class activation map generated by the generator 420. In detail, the determiner 430 determines the indicator representing the falsification of the identification card from a falsification region displayed in the class activation map.

For example, when the falsification region displayed in the class activation map is activated in a hologram form in the identification card, the determiner 430 determines that a hologram of the identification card is falsified.

According to such as embodiment, the disclosure may not transmit the class activation map to the banking application and may transmit, to the banking application, the indicator representing the falsification of the identification card determined by the determiner 430.

However, the disclosure is not limited thereto and may transmit, to the banking application, the class activation map and the indicator representing the falsification of the identification card.

Furthermore, the reference information comparator 335 may extract reference information from identification card data and may compare the extracted reference information with an age and sex predicted from the classification model 350 to check authenticity of the identification card. In this case, the reference information may denote a social security number, a name, an address, and an issued date.

In an embodiment, the reference information comparator 335 may extract the reference information from the identification card data by using an OCR.

When the reference information differs from an age and sex predicted from the classification model 350, the reference information comparator 335 may generate a check request message and may transmit the check request message to the system manager.

The reason that the reference information comparator 335 according to the disclosure generates the check request message and transmits the check request message to the system manager is because face information included in the identification card may not reflect flow of time because an age and sex are predicted as face information included in the identification card.

When the reference information matches an age and sex predicted from the classification model 350, the reference information comparator 335 may transmit the reference information to request determination of authenticity from an external organization server (not shown). For example, the reference information comparator 335 may request determination of the falsification or not of an identification card from an untact identification card authenticity check service providing server (not shown) established by Korea financial telecommunications & clearings institute. As another example, when a captured identification card is a driving license, the reference information comparator 335 may request determination of authenticity of the identification card from Road Traffic Authority or National Police Agency, and when the captured identification card is a resident registration certificate, the reference information comparator 335 may request determination of authenticity of the identification card from a civil complaint portal server (for example, government 24 or civil complaint 24).

The reference information comparator 335 may receive an authenticity check result of the identification card from the external organization server and may transmit the authenticity check result to the banking application installed in the user terminal 100.

Referring again to FIG. 2, the learning unit 250 may allow the neural network model 240 to learn. In detail, the learning unit 250 may allow the neural network model 240 to learn by using pieces of learning data. In this case, the pieces of learning data denote learning data where an indicator for determining authenticity of the identification card is expressed.

In an embodiment, the learning unit 250 may allow the neural network model 240 to learn based on a back propagation algorithm, and thus, may update a filter coefficient and a weight of each of convolution filters included in the neural network model.

Identification card data is stored in the database 260. In this case, the identification card data may be encrypted and stored not to be checked by an unauthorized user. Also, pieces of learning data are stored in the database 260. Also, the database 260 may store an authenticity check result, a class activation map, and a plurality of feature maps extracted by the authenticity determiner 230.

Hereinafter, an identification card authenticity determining method according to the disclosure will be described with reference to FIG. 5.

Figure 5:
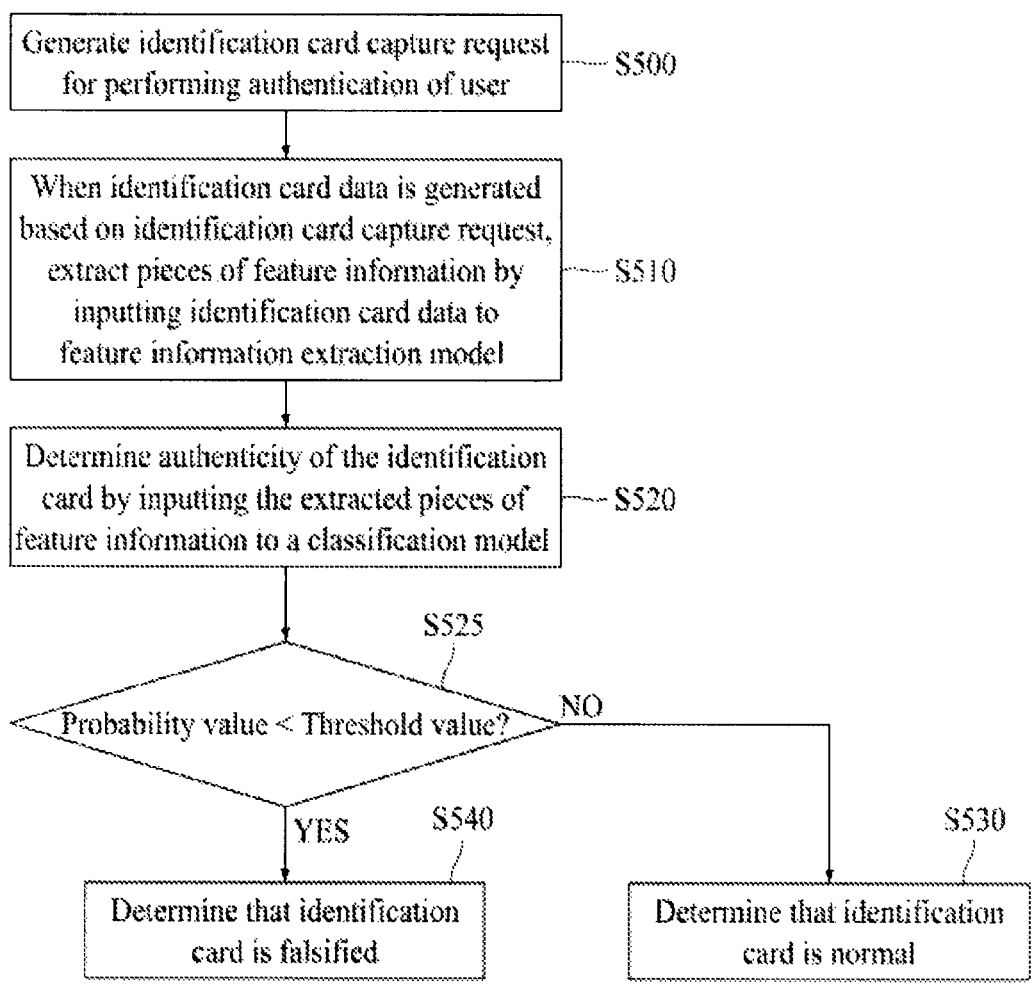
FIG. 5 illustrates a flowchart illustrating an identification card authenticity determining method according to an embodiment of the disclosure.

FIG. 5 illustrates a flowchart illustrating an identification card authenticity determining method according to an embodiment of the disclosure. The identification card authenticity determining method illustrated in FIG. 5 may be performed by the banking system illustrated in FIG. 1.

As illustrated in FIG. 5, the banking system generates an identification card capture request for performing authentication of a user (S500). For example, when an account establishment request is issued by the user, the banking system may generate the identification card capture request for performing authentication of a corresponding user. As another example, when a loan request is issued by the user, the banking system may generate the identification card capture request for performing authentication of a corresponding user. As another example, when an account transfer request is issued by the user, the banking system may generate the identification card capture request for performing authentication of a corresponding user.

When identification card data is generated based on the identification card capture request, the banking system inputs the identification card data to a feature information extraction model to extract pieces of feature information (S510). In an embodiment, the banking system may extract, as feature information, a plurality of feature vectors or feature maps. In this case, each of feature vectors or each of the feature maps expresses an indicator for checking authenticity of the identification card. The indicator for checking authenticity of the identification card includes hologram information in the identification card, reflected light information in the identification card, shadow information in the identification card, Moire pattern information, face information included in the identification card, and reference information included in the identification card. In this case, the Moire pattern denotes a pattern which is generated when display is captured. The reference information denotes an issued date, a social security number, an address, and a name.

According to such an embodiment, the feature information extraction model may be one model which has learned indicators for checking authenticity of an identification card, or may be configured with a plurality of models which has learned for each indicator.

In an embodiment, as illustrated in FIG. 3A described above, the feature information extraction model may be implemented as a CNN layer including a feature information extraction model which extracts a feature vector as feature information about input identification card data and a classification model which classifies a class. In this case, the feature information extraction model may be implemented in a form where n number convolution layers and m number of pooling layers are stacked in layers. The convolution layer is an essential factor where an activation function is reflected after a filter is applied to input data, and the pooling layer may be selectively applied.

In another embodiment, as illustrated in FIG. 3B, the feature information extraction model may include a feature information extraction model configured with n number of convolution layers which extract a feature map as feature information of input identification card data and m number of pooling layers. In this case, the n (where n may be an integer of 2 or more) convolution layers which are sequentially arranged apply a convolution filter having a predetermined size to identification card data to generate a plurality of feature maps. In this case, convolution filters of each convolution layer may be different filters and may be filters which extract different features.

The n convolution layers apply an activation function to the generated plurality of feature maps to assign a nonlinear characteristic to the plurality of feature maps. Here, the activation function denotes a function which assigns a weight to pieces of input information to output a completed result value through combination. In an embodiment, the activation function may be a Relu function which outputs a positive value as-is among pixel values of a feature map and outputs a negative value as 0. In another embodiment, the activation function may be a PRelu function which outputs a positive value as-is among pixel values of a feature map and outputs a negative value as a value reduced by a predetermined size. In the above-described embodiment, the activation function has described as the Relu function or the PRelu function, but this is merely an embodiment and the disclosure is not limited thereto.

The m pooling layers are disposed in at least one output terminal among the n convolution layers and apply a sampling filter having a predetermined size to a plurality of feature maps to decrease a dimension. In an embodiment, the m pooling layers may be a max-pooling layer which extracts a maximum value as a feature value of a feature map among pixel values included in a region corresponding to a sampling filter in each feature map. However, the pooling layer according to the disclosure may be merely max-pooling and may be performed by various methods such as average pooling and long-sum-exponential (LSE), and this may be merely an implementation method difference.

Subsequently, the banking system inputs a plurality of feature vectors or a plurality of feature maps to the classification model to determine authenticity of the identification card (S520).

The classification model calculates a probability value representing authenticity of the identification card by using the plurality of feature vectors or the plurality of feature maps input thereto. To this end, the classification model may include at least one fully connected layer and soft max layer (not shown) as illustrated in FIG. 3A described above, or may include an input layer and a probability value calculation layer as illustrated in FIG. 3B.

In an embodiment, the input layer may be a global average pooling layer which applies a sampling filter having a predetermined size in each feature map to average pixel values included in a region corresponding to the sampling filter, thereby decreasing dimensions of the plurality of feature maps. However, the input layer according to the disclosure may be the global average pooling layer, and moreover, may be configured by various methods such as a fully connected layer.

The probability value calculation layer may be a soft max layer which assigns a weight to the dimension-decreased plurality of feature maps to calculate a probability value representing authenticity of the identification card. However, the probability value calculation layer according to the disclosure may be the soft max layer, and moreover, may be configured by various methods.

Furthermore, the classification model may predict an age and sex of a corresponding user by using a feature map expressing face data of an identification card data. According to such an embodiment, the probability value calculation layer of the classification model may additionally calculate a probability value representing an age and sex as well as a probability value representing authenticity of the identification card.

When the probability value is greater than or equal to the predetermined threshold value (S525), the banking system determines that the identification card is normal (S530). When the probability value output from the classification model is less than the predetermined threshold value (S525), the banking system determines that the identification card is falsified (S540). The banking system provides a determination result to the user.

Hereinafter, a method of displaying a falsification region of an identification card according to an embodiment of the disclosure will be described in more detail with reference to FIG. 6.

Figure 6:
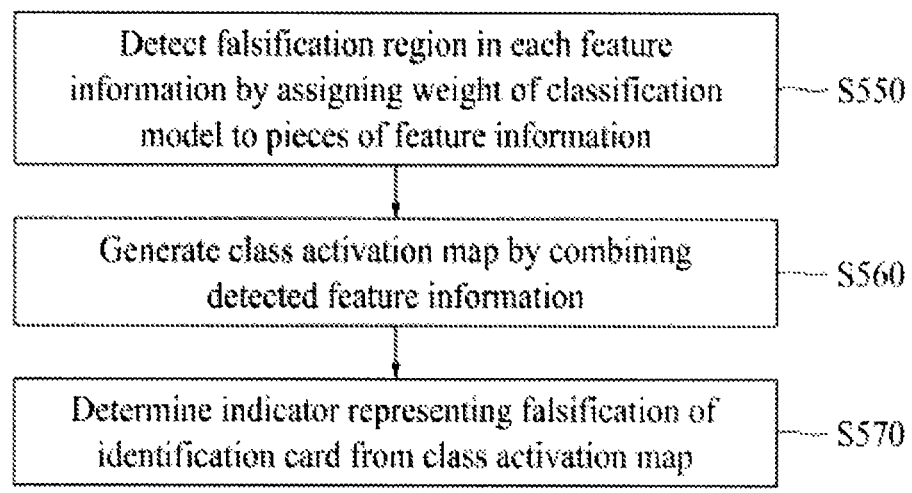
FIG. 6 illustrates a flowchart illustrating a method of displaying a falsification region of an identification card according to an embodiment of the disclosure.

FIG. 6 illustrates a flowchart illustrating a method of displaying a falsification region of an identification card according to an embodiment of the disclosure. The method of displaying a falsification region of an identification card illustrated in FIG. 6 may be performed by the banking system illustrated in FIG. 1.

In this case, a process of extracting a plurality of feature vectors or a plurality of feature maps from identification card data is the same as S500 and S510 illustrated in FIG. 5, and thus, a detailed description is omitted and a process after a process (S510) of extracting the plurality of feature vectors or the plurality of feature maps will be described with reference to FIG. 6.

The banking system assigns a weight of the classification model to each of the plurality of feature vectors or the plurality of feature maps extracted in step S510 to detect a falsification region in each feature vector or feature map (S550). Accordingly, the falsification region is detected for each feature vector or feature map. In this case, the weight of the classification model may denote a weight assigned for classifying the plurality of feature vectors or the plurality of feature maps in the probability value calculation layer.

The banking system combines the detected feature vector or feature map to generate a class activation map (S560). In detail, the banking system summates the activated feature maps to generate a class activation map. The banking system may provide the class activation map to the user. However, this is merely an embodiment, and the banking system may provide the class activation map to only the system manager.

The reason that the banking system according to the disclosure extracts the class activation map from the plurality of feature vectors or the plurality of feature maps is following. The classification model may classify the falsification or not of an identification card from the plurality of feature vectors or the plurality of feature maps when the plurality of feature vectors or the plurality of feature maps are input to the classification model. However, there is a problem where the system manager may not explain an authenticity result because the system manager may not know how the classification model 350 derives a determination result because the classification model 350 based on deep learning model is a black box.

Therefore, the disclosure may extract the class activation map, and thus, because it is possible to explain an authenticity result, the disclosure may effectively respond to an objection of a user, whereby there is an effect where system reliability is enhanced.

The banking system according to the disclosure determines an indicator representing the falsification of the identification card from the generated class activation map (S570). In detail, the banking system determines the indicator representing the falsification of the identification card from a falsification region displayed in the class activation map.

For example, when the falsification region displayed in the class activation map is activated in a hologram form in the identification card, the banking system determines that a hologram of the identification card is falsified.

Furthermore, the banking system may extract reference information from identification card data and may compare the extracted reference information with an age and sex predicted from the classification model to check authenticity of the identification card. In this case, the reference information may denote a social security number, a name, an address, and an issued date.

When the reference information differs from an age and sex predicted from the classification model, the banking system may generate a check request message and may transmit the check request message to the system manager.

The reason that the banking system according to the disclosure generates the check request message and transmits the check request message to the system manager is because face information included in the identification card may not reflect flow of time because an age and sex are predicted as face information included in the identification card.

When the reference information matches an age and sex predicted from the classification model, the banking system may transmit the reference information to request determination of authenticity from an external organization server (not shown). For example, the reference information comparator 335 may request determination of the falsification or not of an identification card from an untact identification card authenticity check service providing server (not shown) established by Korea financial telecommunications & clearings institute. As another example, when a captured identification card is a driving license, the reference information comparator 335 may request determination of authenticity of the identification card from Road Traffic Authority or National Police Agency, and when the captured identification card is a resident registration certificate, the reference information comparator 335 may request determination of authenticity of the identification card from a civil complaint portal server (for example, government 24 or civil complaint 24).

The banking system receives an authenticity check result of the identification card from the external organization server and provides the authenticity check result to the user.

The banking system may allow the neural network model to learn. In detail, the banking system may allow the neural network model 240 to learn by using pieces of learning data. In this case, the pieces of learning data denote learning data where an indicator for determining authenticity of the identification card is expressed.

In an embodiment, the banking system may allow the neural network model 240 to learn based on a back propagation algorithm, and thus, may update a filter coefficient and a weight of each of convolution filters included in the neural network model.

The method of displaying a falsification region of an identification card illustrated in FIG. 6 may be performed after the identification card authenticity determining method illustrated in FIG. 5. In another embodiment, the method of displaying a falsification region of an identification card illustrated in FIG. 6 and the identification card authenticity determining method illustrated in FIG. 5 may be performed simultaneously, and only one of the method of displaying a falsification region of an identification card illustrated in FIG. 6 and the identification card authenticity determining method illustrated in FIG. 5 may be performed selectively.

Figure 7:
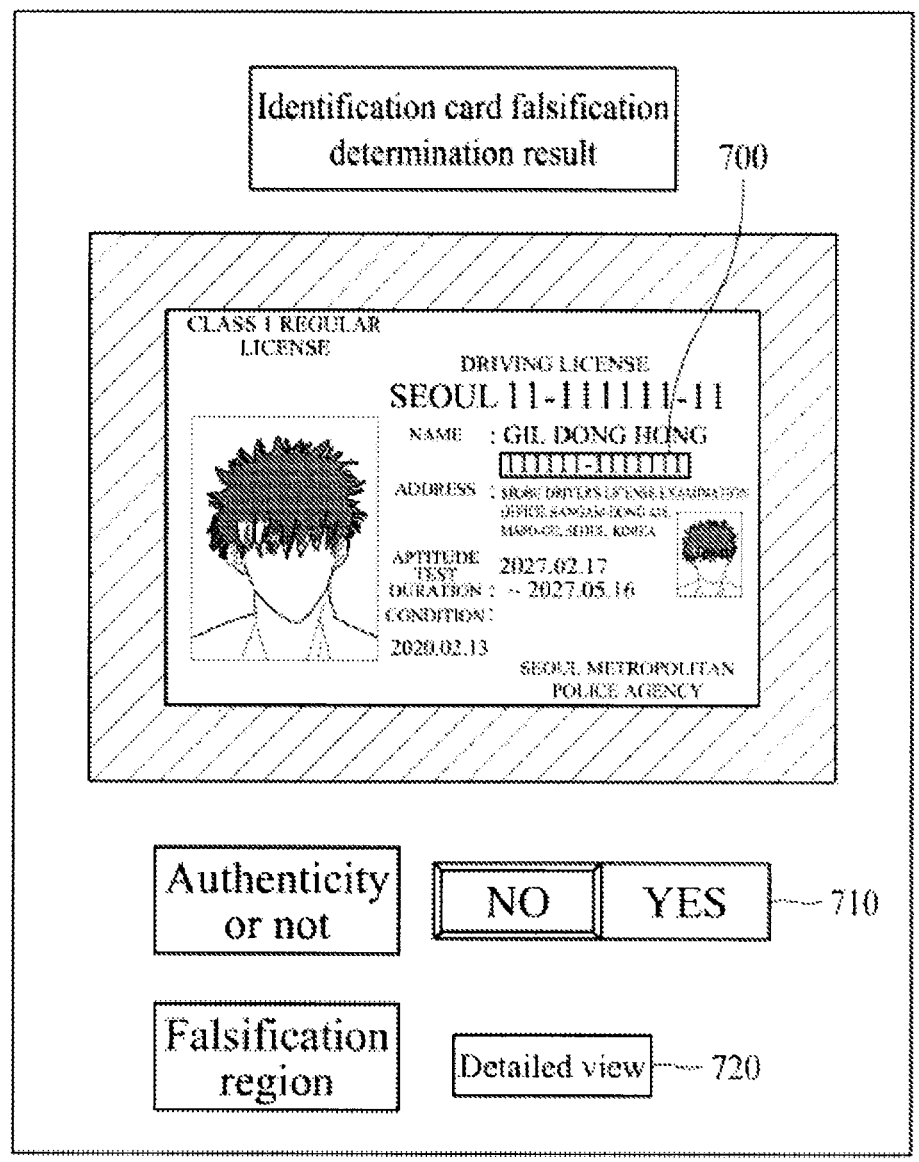
FIG. 7 illustrates an exemplary screen for determining a falsification region of an identification card according to an embodiment of the disclosure.

The identification card authenticity determining system described above through the above-described embodiments may be implemented as in FIG. 7 when a real identification card authenticity determining service is provided. In a manager terminal which checks authenticity of the identification card, image data captured by the user may be output as in FIG. 7, and the authenticity or not of the identification card determined by the identification card authenticity determining system may be displayed 710. For example, as illustrated in FIG. 7, the authenticity or not of the image data may be provided as intuitive UI 710 such as "NO" or "YES". Also, a falsification region 700 obtained through the neural network model 240 may be displayed on the image data, and thus, the falsification region may be intuitively checked. Furthermore, when the system manager selects 'detailed view' 720 for checking the falsification region, the disclosure may be implemented to further display an explanation phrase or image of the reason (for example, mismatch in checking a social security number value, or a hologram variation amount is less than a reference value) that falsification is determined.

The neural network model of the disclosure for determining authenticity of an identification card may reversely trace a determination step of the neural network model in checking a real falsification region after a manager checks an authenticity result, and thus, may accurately calculate an arbitrary value which is based on determining falsification.

Therefore, by improving a conventional identification card authenticity determining system, there is an effect where falsification may be more precisely detected through deep learning and a detection result may be intuitively and precisely checked.

It should be understood by those skilled in the art that the present disclosure can be embodied in other specific forms without changing the technical concept and essential features of the present disclosure.

In the above-described embodiment, it has been described that the identification card authenticity determining method according to the disclosure is applied to the banking service, but in another embodiment, the identification card authenticity determining method according to the disclosure is not limited thereto and may be applied to a service which requires checking of authenticity of an identification card as well as the banking service.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

Therefore, the above-described embodiments should be understood to be exemplary and not limiting in every aspect. The scope of the disclosure will be defined by the following claims rather than the above-detailed description, and all changes and modifications derived from the meaning and the scope of the claims and equivalents thereof should be understood as being included in the scope of the present disclosure.

What is claimed is:

1. An identification card authenticity determining method based on deep learning, the identification card authenticity determining method comprising:
    inputting identification card data to a feature information extraction model to extract pieces of feature information for, a plurality of different indicators for checking authenticity of the identification card, from the identification card data;
    inputting the feature information extracted for each indicator to a classification model implemented with a neural network algorithm to determine authenticity of the identification card; and
    when it is determined that the identification card is falsified, extracting a class activation map, where a falsification region is activated on the identification card data, activated, from the feature information extracted for each indicator, the falsification region being a region corresponding to an indicator used for determining that the identification card is falsified,
    wherein the extracting the class activation map comprises:
        assigning a weight of the classification model to each feature information extracted for each indicator to activate each feature information; and
        combining the activated each feature information to generate the class activation map where the falsification region is activated,
    wherein the indicator for checking authenticity of the identification card comprises at least one of hologram information in the identification card, reflected light information in the identification card, shadow information in the identification card, or Moire pattern information.

2. The identification card authenticity determining method of claim 1, wherein the determining the authenticity of the identification card comprises, when a probability value output from the classification model is less than a predetermined threshold value, determining that the identification card is falsified.

3. The identification card authenticity determining method of claim 1, wherein the classification model comprises a soft max layer assigning a weight to the feature information extracted for each indicator to calculate a probability value representing the authenticity or not of the identification card.

4. The identification card authenticity determining method of claim 1, wherein the classification model comprises a global average pooling layer applying a sampling filter having a predetermined size to each feature information to average pixel values included in a region corresponding to the sampling filter, thereby decreasing dimensions of the feature information extracted for each indicator.

5. The identification card authenticity determining method of claim 1, wherein the feature information extraction model comprises n (where n is an integer of 2 or more) number of convolution layers applying a convolution filter having a predetermined size to the identification card data to generate the feature information for each indicator and applying an activation function to the feature information generated for each indicator to assign a nonlinear characteristic to the feature information generated for each indicator, the n convolution layers being sequentially arranged.

6. The identification card authenticity determining method of claim 1, wherein the feature information extraction model comprises m (where m is an integer of more than 1) number of pooling layers respectively disposed at output terminals of at least one of n number of convolution layers generating the feature information for each indicator from the identification card data, the m pooling layers applying a sampling filter having a predetermined size to the feature information generated for each indicator to reduce a dimension.

7. The identification card authenticity determining method of claim 1, wherein the indicator for checking authenticity of the identification card further comprises at least one of, face data included in the identification card or reference information included in the identification card.

8. The identification card authenticity determining method of claim 1, wherein the feature information is a feature map having an image form or a feature vector obtained by inputting the identification card data to the feature information extraction model.

9. An identification card authenticity determining apparatus based on deep learning, the identification card authenticity determining apparatus comprising:

a feature information extractor configured to input identification card data, obtained by capturing an identification card, to a feature information extraction model to extract pieces of feature information for a plurality of different indicators, for checking authenticity of the identification card, from the identification card data;

a determiner configured to input the feature information extracted for each indicator to a classification model implemented with a neural network algorithm to determine authenticity of the identification card; and a falsification region extractor configured to extract a class activation map, where a falsification region is activated on the identification card data, from the feature information extracted for each indicator when it is determined that the identification card is falsified, the falsification region being a region corresponding to an indicator used for determining that the identification card is falsified, wherein the falsification region extractor comprises:

an activator configured to assign a weight of the classification model to each feature information extracted for each indicator to activate each feature information; and a generator configured to combine the activated each feature information to generate the class activation map where the falsification region is activated, wherein the indicator for checking authenticity of the identification card comprises at least one of hologram information in the identification card, reflected light information in the identification card, shadow information in the identification card, or Moire pattern information.

10. The identification card authenticity determining apparatus of claim 9, wherein the determiner determines that the identification card is falsified when a probability value output from the classification model is less than a predetermined threshold value.

11. The identification card authenticity determining apparatus of claim 9, wherein the classification model comprises a soft max layer assigning a weight to the feature information extracted for each indicator to calculate a probability value representing the authenticity or not of the identification card.

12. The identification card authenticity determining apparatus of claim 9, wherein the classification model comprises a global average pooling layer applying a sampling filter having a predetermined size to each feature information to average pixel values included in a region corresponding to the sampling filter, thereby decreasing dimensions of the feature information extracted for each indicator.

13. The identification card authenticity determining apparatus of claim 9, wherein the feature information extraction model comprises n (where n is an integer of 2 or more) number of convolution layers applying a convolution filter having a predetermined size to the identification card data to generate the feature information for each indicator and applying an activation function to the feature information generated for each indicator to assign a nonlinear characteristic to the feature information generated for each indicator, the n convolution layers being sequentially arranged.

14. The identification card authenticity determining apparatus of claim 9, wherein the feature information extraction model comprises m (where m is an integer of more than 1) number of pooling layers respectively disposed at output terminals of at least one of n number of convolution layers generating the feature information for each indicator from the identification card data, the m pooling layers applying a sampling filter having a predetermined size to the feature information generated for each indicator to reduce a dimension.

15. The identification card authenticity determining apparatus of claim 9, wherein the indicator for checking authenticity of the identification card further comprises at least one of, face data included in the identification card or reference information included in the identification card.

* * * * *